Figure 1:
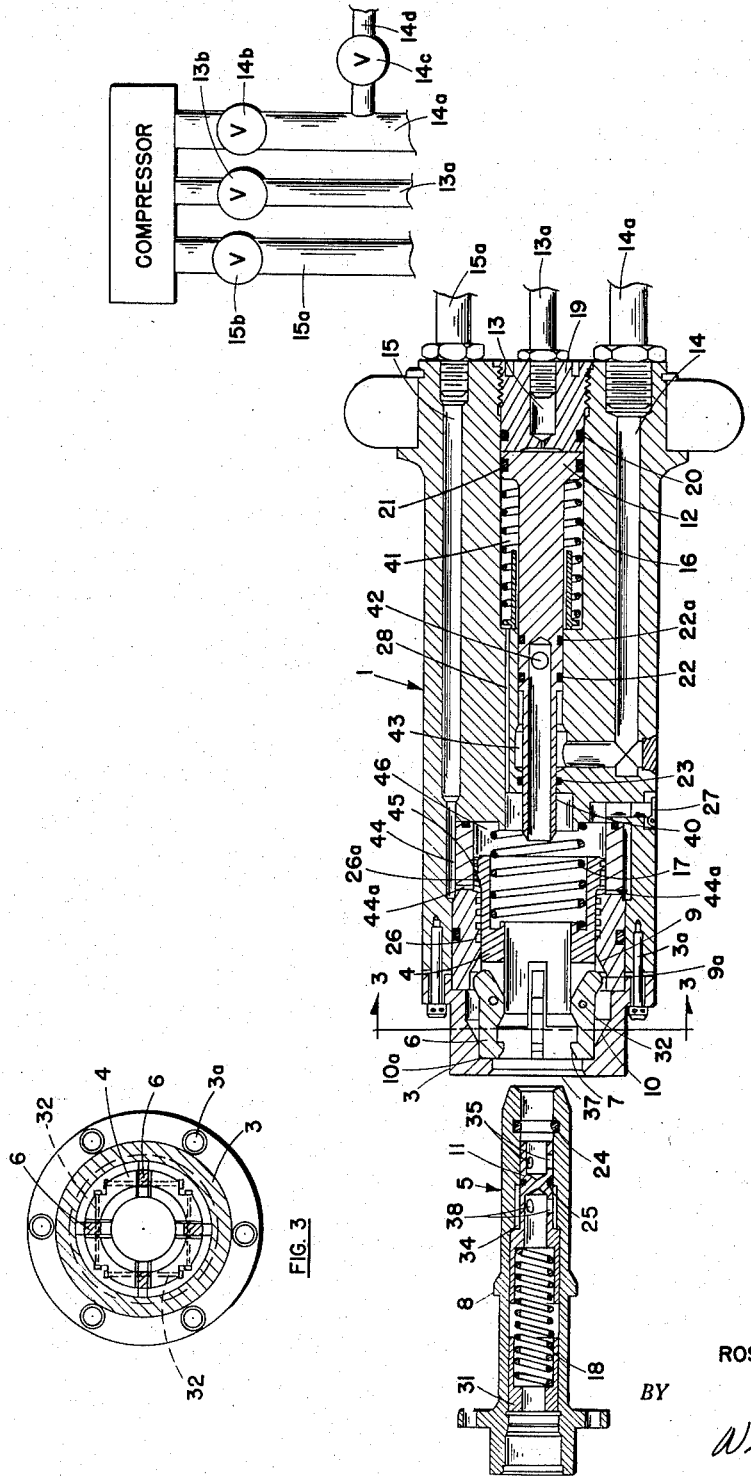

United States Patent Office 2,887,124
Patented May 19, 1959

2,887,124

REMOTELY DISCONNECTABLE COUPLING

Ross M. Mehl, Monterey Park, Calif., assignor to North American Aviation, Inc.

Application December 23, 1955, Serial No. 554,967

12 Claims. (Cl. 137—614)

This invention relates to a remotely disconnectable coupling and, more particularly, to a remotely disconnectable coupling for use in high pressure pneumatic or hydraulic systems.

In certain installations, it is desirable to cause couplings to be disconnected at a location remote from the coupling itself. This is especially true where there is danger of a high pressure leak resulting from the disconnecting of the coupling, or where there is inherent danger in the operation of the equipment, such as a guided missile. The present invention was conceived to be used to fill a three-thousand pounds per square inch pneumatic system of a guided missile from the ground just before take-off. At such time, it may not be desirable for personnel to be in close contact with the missile. After the system is filled and the missile is, in other respects, ready for take-off, according to the present invention, the connector member of the coupling can be disconnected from its nipple within the missile and will fall to the ground by the force of gravity.

The present invention consists of two assemblies, a nipple to be fitted in the missile and having a self-sealing valve, and a connector to be attached to ground installations and also having a self-sealing valve. The connector is slipped on to the nipple, the nipple telescoping into the connector and being locked therein by dogs snapping on to a lip or latch flange of the nipple. The operations of activating, filling, draining and disconnecting, performed after connecting to the missile, can all be done from a place of any desirable distance in the ground installations.

This invention has several advantages over the other known couplings. One is that the locking dogs are secured by pins or a ring on a floating sleeve within the connector and when the system is pressurized, the dog pins are relieved of the load of holding the connector on the nipple. The load is transferred to a lip on the mouth of the connector. This lip will hold a much greater load than the pins holding the dogs on the sleeve. A second advantage is that both the nipple and the connector have valves therein which are positively closed against any fluid flow unless they are actuated by applying pressure to an actuation line. A third advantage is that the coupling can be remotely operated and the connector can be remotely disconnected from the nipple. A fourth advantage is that the connector can be connected to and disconnected from the nipple without any leakage when both are under pressure.

Therefore, an object of this invention is to provide an improved coupling.

A principal object of this invention is to provide a remotely disconnectable pneumatic or hydraulic coupling.

A further object of this invention is to provide a remotely disconnectable coupling in which the pins or means holding the dogs are relieved of any force against them by much stronger structure.

A further object of this invention is to provide a remotely disconnectable coupling in which fluid flow is positively shut off in both the nipple and the connector by an automatic means.

Another object of this invention is to provide a remotely disconnectable coupling that can be actuated to allow fluid flow therethrough from a remote location.

An object of this invention is to provide a remotely disconnectable coupling which can be connected and disconnected without leakage when it is pressurized.

Figure 2:
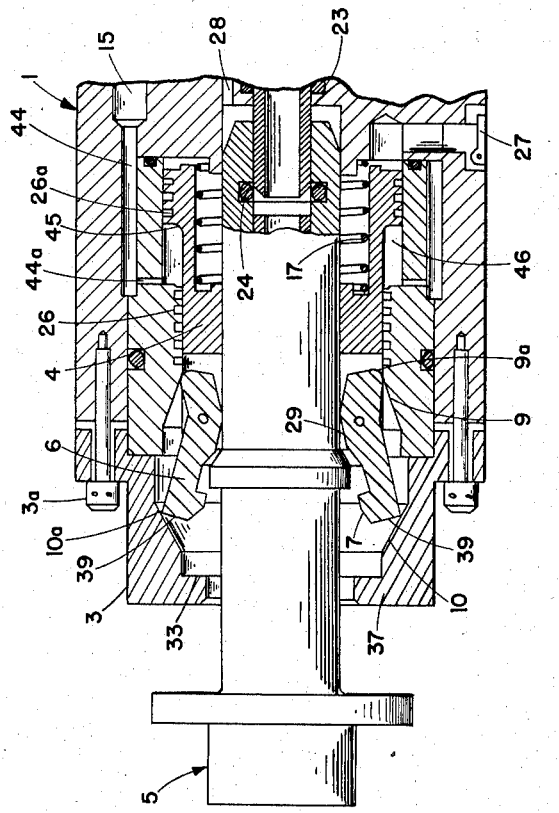

Other objects of invention will become apparent from the following description taken in connection with the accompanying drawings, in which Fig. 1 shows the coupling disconnected in position for the nipple to telescope into the connector, and a compressor to supply the connector;

Fig. 2 shows an enlarged cutaway view of the connector with nipple telescoped therein and in position to be released therefrom;

And Fig. 3 is a view taken along the lines 3—3 of Fig. 1.

Referring to Fig. 1, in which the coupling is shown in position ready for connection; and referring to Fig. 2, in which the coupling is shown in the process of being disconnected, nipple 5 is considered to be held fixed in an installation, and connector or first member 1 has been telescoped onto it for filling a system to which nipple or second member 5 is secured. In nipple 5 is retainer 31 holding one end of spring 18, with spring 18 having its other end inserted against the inside of valve or poppet 11. Thus, spring 18 is holding poppet 11 in a closed position toward the right of nipple 5 in Fig. 1. In this position seal 25 effects a closure with the inner wall of nipple 5 and poppet 11. When poppet 11 is pushed toward the left, seal 25 is broken, and fluid flow is permitted from the right hand opening of nipple 5 through orifices 35 into annular casing 34 and then into the poppet orifices 38 into the system to which the nipple is secured. Nipple 5 is generally cylindrical except for latch or lip 8 onto which dogs 6 are secured when nipple 5 is inserted in connector body 1.

In connector 1, which is outwardly of generally cylindrical configuration, floating sleeve 4 is held in position toward the left by spring or force generating means 17. Referring also to Fig. 3, a plurality of dogs 6 are secured on sleeve 4 by pins 32 or by a ring secured to said sleeve and extending through said dogs.

When connector 1 is slipped onto nipple 5, latch flange 8 on nipple 5 contacts surface 7 on dogs 6. This permits inner surface 33 of lip 37 to move axially away from dogs 6, allowing cam follower surface 9a on dogs 6 to contact cam surface 9, forcing the latching portion of the dogs radially outward free from and over-riding latch flange 8, thus enabling spring 17 to move the sleeve-pin-dog assembly 4, 32, and 6 in the axial direction of the immediately previous movement of connector 1. The pivotal or radial movement of the dogs about their holding pins 32 coincides with their movement in the direction along the axis of body 1. First member 1 can be moved onto second member 5 until latch 8 is stopped by internal surfaces 29 of the dogs. At that point first member 1 is released by the operator and spring 17 causes member 1 to move in the axial direction opposite to its previous movement, forcing cam follower corner 10a of dogs 6 against cam surface 10 in cap 3, causing them to retract radially, returning dog surfaces 39 to their original location against surface 33 of lip 37 and latching the dogs on flange 8. When surfaces 39 of dogs 6 are in the position of being forced against lip surface 33, by spring 17, any pressures created in the coupling tending to move nipple 5 axially away from connector 1 will be applied to lip 33 and not to pins 32 which are in a position free of any forces thereon.

When nipple 5 is latched in position, its inner end is adjacent to valve or poppet 40 which is an extension of actuating piston 12. Seal 21 on piston 12 seals off cylinder 41 from fill and drain actuating line 13. Poppet 40 and piston 12 are held in the closed position, as shown in Fig. 1, by spring 16. Poppet 40 is sealed from cylinder 41 by seal 22a and from chamber 46 by seal 23. When pressurized fluid is fed into line 13 through line 13a and valve 13b from a remote compressor, as shown in Fig. 1, piston 12 is forced to the left and poppet 40 is moved into nipple 5 where it operates against poppet 11 to move it into its open position. Poppet 40 is sealed in nipple 5 by seal 24. When poppet 40 is moved into and held in its actuated position by pressure in actuating line 13, it is open through hole 42 to annulus 43 which is fed by supply line 14 through line 14a and valve 14b from the compressor. Before poppet 40 is moved to its open position, it is sealed from annulus 43 by seal 22. Thus, when poppet 40 and poppet 11 have been opened by actuating piston 12, the coupling is ready for filling or draining operation through line 14. It should be noted that the movement of poppet 40 against poppet 11 exerts an axial force on spring 18 and retainer 31, which tends to push nipple 5 away from connector 1, and thereby latch flange 8 further forces dog surfaces 39 against lip surface 33 to further assure removal of forces on pins 32.

Valve 14b in line 14a, connected to line 14, is at a position remote from the coupling, as are valves 13b, 14c and 15b; and in order to fill the system connected to nipple 5, it is merely necessary to open the remote valve 14b, allowing fluid under pressure to enter line 14. In the same way, if it is desired to drain the system, valve 14c connected to line 14a can be opened to relieve the system of the pressure in it through line 14d. When the drain or fill operation is completed, pressure is relieved in line 13 and springs 18 and 16 close poppets 11 and 40, respectively, sealing nipple 5 and body 1.

At this time, connector body 1 is ready to be disconnected from nipple 5. This is done by allowing fluid pressure from the remote compressor or pump, through valve 15b and line 15a, to enter disconnect line 15 which feeds into annulus 44 and holes or apertures 44a. Pressure through these holes operates against the extended flange or pressure piston portion 45 of sleeve 4 and moves sleeve 4 axially to the right in the same manner as it is moved for connecting to nipple 5. Labyrinth seals 26 and 26a form the seal along the surface of sleeve 4 and the cylindrical chamber 46 in which the sleeve moves axially. The position of sleeve 4 after being forced to the right, as caused by exerting pressure through line 15, is shown in Fig. 2, and in it, body 1 will fall off of nipple 5 due to the force of gravity if properly mounted. If it is mounted so that it will not fall by gravity, it can be pulled off the nipple. Cylindrical area 46 is open to the atmosphere by vent 27 which prevents the building up of any pressure in cylinder 46 so that there will be no resistance to the movement of sleeve 4 to the right other than that exerted by spring 17.

Cylinder 41 is similarly open to chamber 46 by vent 28. Cap 3 is secured to body 1 by bolts 3a, and plug 19, threadedly engaged in way of piston 12, houses seal 20 which makes a tight closure between cylinder 41 and the exterior of body 1.

It should be noted that great advantage is gained in removing the holding force from relatively weak dog pins 32 by having dog surfaces 39 resting against lip surface 33, which provides a very strong support. At higher pressures such as three-thousand pounds per square inch, for which this coupling was created, this arrangement is of considerable importance. Any holding strength that is required to hold the nipple and the connector together in axial relationship is built into lip 37. In contrast it would be very difficult, if not impossible, to make dog pins of large enough size to withstand three-thousand or more pounds per square inch. Further, the benefit of the spring closed poppets in both members and the means of opening them through actuating line 13 is highly desirable. This makes possible the unique feature of being able to connect and disconnect body 1 to nipple 5 when the system is under pressure. In addition, the advantages of being able to remotely operate and disconnect from a system to be filled or drained are of great value, and in some applications they are a necessity.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a coupling comprising first and second axially separable tubular members adapted to be secured together, a plurality of dogs holding said members in axial relationship, each of said dogs being secured by pin means to said first member, said dogs being mounted to rotate radially outward on said pin means, means within said first member to relieve said pin means of any force thereon tending to separate said tubular members when said members are being held in said axial relationship by said dogs.

2. In a coupling comprising first and second axially separable tubular members adapted to be secured together, a plurality of dogs holding said members in axial relationship, means securing said dogs in said first member, means to relieve said securing means of any force thereon tending to separate said tubular members when said members are held in axial relationship by said dogs and means attached to said last-mentioned means to disconnect said members.

3. In a remotely disconnectable coupling comprising first and second axially separable tubular members adapted to be secured together in telescopic relationship, a force generating means in said first member, a plurality of dogs holding said members in axial relationship in response to said force generating means, pin means securing said dogs in said first member, means relieving said pin means of any force thereon tending to separate said tubular members when said dogs are subjected to said force generating means, and pressure responsive means to release said force generating means from said dogs to permit disconnection of said members.

4. A remotely disconnectable coupling comprising first and second axially separable tubular members adapted to be secured together in telescopic relationship, a force generating means in said first member, a plurality of dogs holding said members in axial relationship in response to said force generating means, pins secured in said first member and extending through said dogs thereby securing said dogs to said first member, means relieving said pins of any force tending to separate said tubular members when said dogs are subjected to said force generating means, and remotely controllable means in connection with said pin relieving means to disconnect said members.

5. A remotely disconnectable coupling comprising first and second axially separable tubular members adapted to be secured together in telescopic relationship, a plurality of dogs holding said members in axial relationship, pins secured in said first member and extending through said dogs thereby securing said dogs in said first member, floating sleeve means adapted to relieve said pins of any force thereon tending to separate said tubular members, and remotely operable means on said sleeve means to cause said sleeve means to disengage said dogs and to permit said members to be disconnected.

6. A remotely disconnectable coupling comprising first and second axially separable tubular members adapted to be secured together in telescopic relationship, a plurality of dogs holding said members in axial relationship, pins holding said dogs in said first member, floating sleeve means relieving said pins of any force thereon tending to separate said tubular members, and remotely operable means on said sleeve means to cause said sleeve means to disengage said dogs and to permit said members to be disconnected.

7. A remotely disconnectable coupling comprising first and second axially separable tubular members adapted to be secured together in telescopic relationship, a plurality of dogs holding said members in axial relationship, a floating sleeve in said first member, pins securing said dogs to said sleeve, a spring extending within said sleeve and holding said sleeve in position to lock said dogs on said second member, a lip on said first member surrounding said second member, said dogs having one end forced against said lip thereby relieving said pins of any force tending to separate said tubular members, and remotely operable means on said sleeve to move said dogs and said sleeve away from said lip to disengage said dogs from said second member.

8. In a remotely disconnectable coupling comprising first and second axially separable tubular members adapted to be secured together in telescopic relationship, a plurality of dogs holding said members in axial relationship, a floating sleeve in said first member connected to move axially relative to said telescopic relationship, pins securing said dogs to said sleeve, said sleeve being operable to receive said second member and to lock said dogs on said second member, a lip on said first member surrounding said second member, a spring within and abutting said sleeve forcing said dogs against said lip thereby relieving said pins of any force tending to separate said tubular members, cam means in said first member outward from and adjacent said dogs, said dogs having cam follower means to move radially outward and inward on said cam means when said sleeve is moved axially, a flange extending radially outward from said sleeve, and a means to apply pressure on said flange from a remote source so as to axially move said sleeve away from said lip and said second member whereby said cam means and said cam follower means cause said dogs to release said second member from said first member.

9. A valved coupling comprising first and second axially separable tubular members adapted to be secured together in telescopic relationship, spring closed valves in said first and second members preventing flow through said members in the direction from said second to said first member, a piston in said first member associated with said valves for the opening thereof when said members are secured together, a floating sleeve adapted for axial movement in said first member, a plurality of dogs connected to said sleeve, pins securing said dogs to said sleeve, said dogs connected for radial movement to correspond to said axial movement of said sleeve, said sleeve being in position to receive said second member, said dogs arranged to hold said second member in said first member, a lip on said first member surrounding said second member, a spring within and abutting said sleeve, said spring holding said dogs against said lip and said piston connected to further force said dogs against said lip so that said pins are relieved of any force tending to separate said tubular members, cam means in said first member outward from and adjacent said dogs, said dogs having cam follower means to move radially outward and inward on said cam means when said sleeve is moved axially, a flange extending radially outward from said sleeve, and a means to apply pressure on said flange so as to axially move said sleeve away from said lip and said second member whereby said cam means and said cam follower means cause said dogs to release said second member from said first member.

10. A remotely disconnectable coupling comprising first and second axially separable tubular members adapted to be secured together in telescopic relationship, spring closed valves in said first and second members preventing flow through said members in the direction from said second to said first member, a remotely operable piston in said first member associated with said valves for the opening thereof when said members are secured together, a floating sleeve adapted for axial movement in said first member, a plurality of dogs connected to said sleeve, pins securing said dogs to said sleeve, said dogs connected for radial movement to correspond to said axial movement of said sleeve, said sleeve connected to receive said second member therein, a latch flange on said second member, said dogs arranged to fit on said latch flange and hold said second member in said sleeve, a lip on said first member and adjacent one end thereof and surrounding said second member, a spring within and abutting said sleeve, said spring holding one end of said dogs against said lip and said piston connected to further force said dogs against said lip so that said pins are relieved of any force tending to separate said tubular members, cam means in said first member outward from and adjacent said dogs, said dogs having cam follower means to move radially outward and inward on said cam means when said sleeve is moved axially, a sleeve flange extending radially outward from said sleeve, and a means to apply fluid pressure on said sleeve flange from a remote source so as to axially move said sleeve away from said latch flange, said lip, and said second member whereby said cam means and said cam follower means cause said dogs to release said second member from said first member.

11. In a coupling in which one member telescopes into the other member and wherein dogs in said other member latch on a lip of said one member to hold said members in axial relationship, the combination comprising pin means securing said dogs for rotative motion about an axis normal to the motion of telescoping in said other member, means to relieve said pin means of any force tending to separate the members and to transfer said force to a stronger structure in said other member, said relieving means allowing motion of said dogs relative to said other member parallel to the direction of telescoping, and means in connection with said pin relieving means to disconnect said members.

12. In a coupling in which one member telescopes into the other member wherein dogs in said other member latch on a lip of said one member to hold said members in axial relationship and in which there is an automatic closed valve in each of said members, the combination comprising holding means securing said dogs axially within said other member, means to relieve said holding means of any force tending to separate the members and to transfer said holding force to a stronger structure in said other member, and valve opening means in said other member connected to apply additional force to hold said dogs against said stronger structure when said valves are open.

References Cited in the file of this patent

UNITED STATES PATENTS

| 1,459,537 | King | June 19, 1923 |
| 2,040,177 | Johnson | May 12, 1936 |
| 2,397,342 | Farrell | Mar. 26, 1946 |
| 2,425,500 | Wiggins | Aug. 12, 1947 |
| 2,543,590 | Swank | Feb. 27, 1951 |
| 2,637,572 | Bruce | May 5, 1953 |

FOREIGN PATENTS

| 7,821 | Great Britain | May 29, 1888 |
| 985,539 | France | Mar. 14, 1951 |